(12) United States Patent
Pentland (10) Patent No.: US 9,932,743 B2
(45) Date of Patent: Apr. 3, 2018

(54) DAMPENING MECHANISMS FOR COMPOUND APPLICATOR

(71) Applicant: Ingersoll Products Inc., Ingersoll (CA)

(72) Inventor: Jamie Pentland, London (CA)

(*) Notice: Subject to any disclaimer, the term of this patent is extended or adjusted under 35 U.S.C. 154(b) by 0 days.

(21) Appl. No.: 15/383,262

(22) Filed: Dec. 19, 2016

(65) Prior Publication Data
US 2017/0096822 A1  Apr. 6, 2017

Related U.S. Application Data

(63) Continuation of application No. PCT/CA2015/000408, filed on Jun. 22, 2015.

(60) Provisional application No. 62/016,848, filed on Jun. 25, 2014.

(51) Int. Cl.
| | | |
|---|---|---|
| *E04F 21/16* | (2006.01) | |
| *E04F 21/165* | (2006.01) | |
| *E04F 21/08* | (2006.01) | |
| *F16F 9/04* | (2006.01) | |
| *B05C 17/01* | (2006.01) | |
| *B05C 5/02* | (2006.01) | |

(52) U.S. Cl.
CPC ...... *E04F 21/1652* (2013.01); *B05C 17/0123* (2013.01); *E04F 21/08* (2013.01); *F16F 9/04* (2013.01); *B05C 5/0262* (2013.01)

(58) Field of Classification Search
CPC .... B05C 17/00576; E04F 21/06; E04F 21/08; E04F 21/165

USPC .......................................................... 401/176
See application file for complete search history.

(56) References Cited

U.S. PATENT DOCUMENTS

| | | | | |
|---|---|---|---|---|
| 2,902,190 A * | 9/1959 | Hosler | ............. | B05C 17/00576 222/327 |
| 3,029,985 A * | 4/1962 | Krueger | ............ | B05C 17/00576 222/327 |
| 4,022,355 A * | 5/1977 | Sabaka | ............. | B05C 17/00576 222/327 |
| 4,869,403 A * | 9/1989 | Bruning | ............ | B05C 17/00576 222/327 |
| 8,007,475 B2 * | 8/2011 | Kosinski | ............ | A61M 5/31511 604/191 |
| 2014/0084022 A1 * | 3/2014 | Paul | ................. | B05C 17/00576 222/80 |

* cited by examiner

*Primary Examiner* — Jennifer C Chiang
*Assistant Examiner* — Bradley Oliver
(74) *Attorney, Agent, or Firm* — Ridout & Maybee LLP; Mark A. Koch (57) ABSTRACT

A dampening mechanism in combination with a compound applicator. The combination includes a compound applicator which further includes an incrementally iterative advancement mechanism for urging a plunger along a tube reservoir in preselected incremental strokes. The plunger urges compound along the tube reservoir and out through an applicator head. The compound applicator includes a device for dampening pressure spikes created in the tube reservoir during an incremental stroke of the plunger.

12 Claims, 11 Drawing Sheets

DAMPENING MECHANISMS FOR COMPOUND APPLICATOR

The present application is a national stage entry of international application PCT/CA2015/000408 which claims priority from regularly filed U.S. provisional patent application 62/016,848 filed Jun. 25, 2014 under the title; PLUNGER FOR COMPOUND APPLICATOR in the name of Jamie Pentland.

FIELD OF THE INVENTION

The present concept relates to compound applicators and more particularly relates to dampening mechanisms used in compound applicators.

BACKGROUND OF THE INVENTION

Manual compound applicators normally utilize a trigger actuated advancement mechanism which pushes a push rod down a tubular reservoir which moves a plunger along the inside diameter of the tubular reservoir which in turn urges the compound housed within the tubular reservoir out through an exit end of the compound applicator.

By its very nature the advancement mechanism which is manually actuated creates pressure spikes within the tubular reservoir wherein the pressure is greatest when the trigger is first actuated and normally the pressure slowly decreases as one approaches the end of the trigger stroke.

These pressure fluctuations translate into variations in the quantity of material which is being ejected out of the end of the compound applicator thereby resulting in non-uniform distribution of the compound material that is being ejected out of the compound applicator.

There is a need for a compound applicator which minimizes the pressure fluctuations within the tubular reservoir thereby resulting in a more uniform distribution of material being ejected out of the compound applicator.

SUMMARY OF THE INVENTION

The present concept is damping mechanisms in a compound applicator, the compound applicator including an incrementally iterative manual advancement mechanism for urging a plunger along a tube reservoir in preselected incremental strokes, and an applicator head communicating with the tube reservoir and distributing the compound.

One such damping mechanism relates to the plunger which further includes a piston which includes a means for dampening pressure spikes created in the tube reservoir at the beginning of an incremental stroke of the piston.

Preferably wherein the dampening means includes a diaphragm mounted to the plunger which is moveable between a high pressure position and a low pressure position.

As an alternative to the plunger with a damping means described above, another damping mechanism relates to the applicator head which further includes a pressure control connector which includes a means for dampening pressure spikes created in the tube reservoir at the beginning of the incremental stroke of the piston and travelling down the tube reservoir.

Preferably wherein the dampening means includes one or more diaphragms mounted to the applicator head which is movable between a high pressure and low pressure position.

A dampening mechanism in combination with a compound applicator, the combination comprises:

a) a compound applicator which includes an incrementally iterative advancement mechanism for urging a plunger along a tube reservoir in preselected incremental strokes, the plunger urging compound along the tube reservoir and out through an applicator head;

b) the compound applicator includes a means for dampening pressure spikes created in the tube reservoir during an incremental stroke of the plunger.

Preferably wherein the dampening means is mounted outside of the tube reservoir.

Preferably wherein the dampening means includes a resiliently deformable diaphragm with one side exposed to atmosphere and the other side exposed to the compound such that a pressure spike in the compound resiliently deforms the diaphragm thereby reducing the pressure spike in the compound.

Preferably further includes a pressure control connector for connecting the tube reservoir to an applicator head body and channelling compound from the reservoir to the body, the connector includes a hollow transverse section dimensioned to fit in a socket defined in the body, wherein at least one distal end of the transverse section includes the diaphragm.

Preferably wherein the pressure control connector includes a hollow longitudinal section attached to a hollow transverse section.

Preferably wherein the connector pivots within the socket between a down position and an up position about a pivot axis.

Preferably wherein the connector includes a hollow cylindrical transverse section dimensioned to fit in a cylindrical socket wherein each distal end of the transverse section includes the diaphragm.

Preferably wherein the dampening means mounted inside of the tube reservoir.

Preferably wherein the plunger includes a piston which includes a means for dampening pressure spikes created in the tube reservoir during an incremental stroke of the piston.

Preferably wherein the dampening means includes a resiliently deformable diaphragm mounted to the piston, with one side exposed to atmosphere and the other side exposed to the compound such that a pressure spike created by an incremental stroke of the piston deforms the diaphragm thereby absorbing a portion of the pressure spike which reduces the pressure spike in the compound.

Preferably wherein the diaphragm moveable between a low pressure position and a high pressure position.

Preferably wherein the piston includes a mounting cup for receiving the diaphragm thereon forwardly of the piston.

Preferably wherein the mounting cup extending forwardly from a front face of the piston, the forward portion of the cup dimensioned to receive the diaphragm thereon.

Preferably wherein the diaphragm includes bellows sidewalls, and a top membrane.

Preferably wherein the piston further includes vents for communicating air into the mounting cup thereby exposing the back side of the diaphragm to atmospheric pressure.

Preferably wherein the compound applicator further includes an applicator head for dispensing compound, the head includes a diaphragm mounted therein with one side exposed to atmosphere and the other side exposed to the compound such that a pressure spike resiliently deforms the diaphragm thereby reducing the pressure spike in the compound

BRIEF DESCRIPTION OF THE DRAWINGS

The present concept will now be described by way of example only with reference to the following drawings in which.

DETAILED DESCRIPTION OF THE PREFERRED EMBODIMENT

Figure 2:
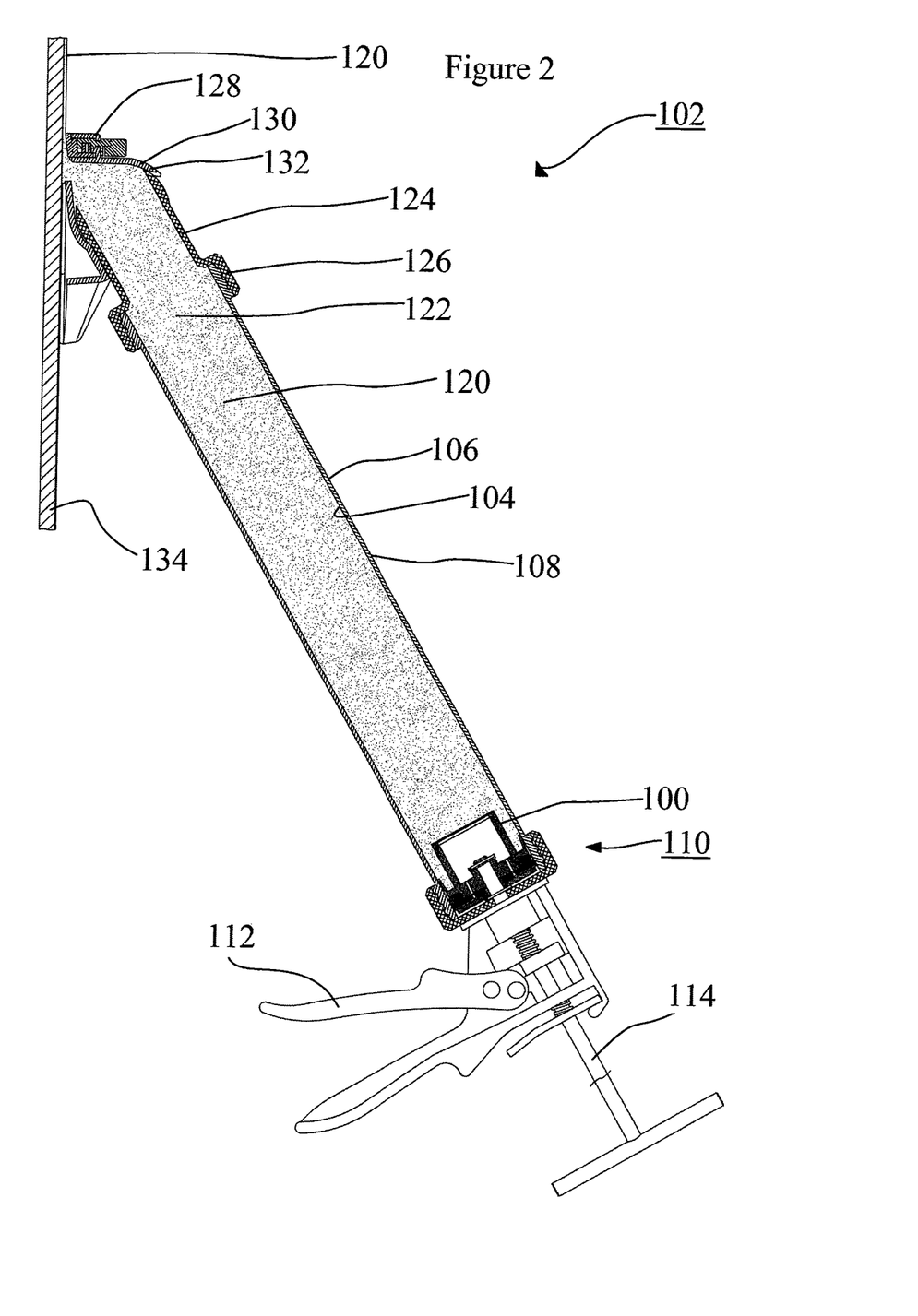
FIG. 2 is a side cross sectional view of a compound applicator with a plunger with damping mechanism deployed onto a portion of drywall.
Figure 3:
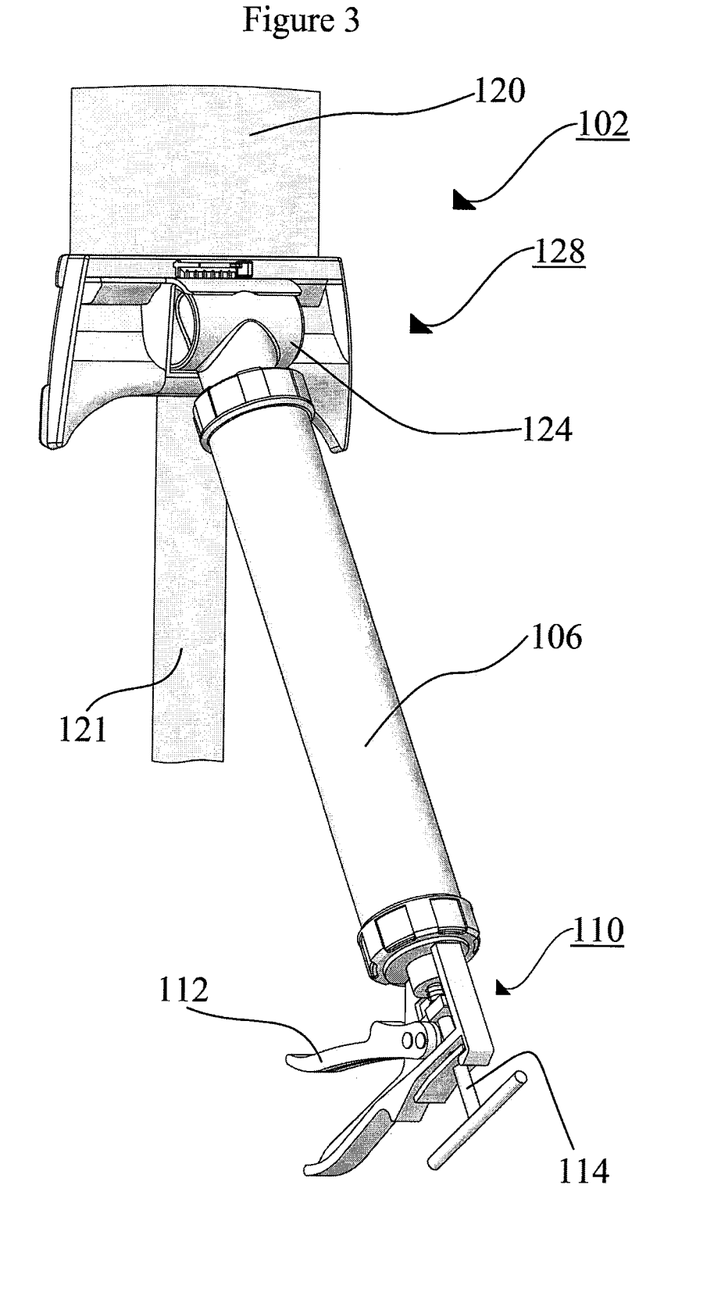
FIG. 3 is a schematic perspective view of a compound applicator with a plunger with damping mechanism shown together with compound being applied to a wall which has been taped.

Referring first of all to FIG. 2 which shows a compound applicator 102 which includes a plunger 100 housed within the inside diameter 104 of a tube reservoir 106 which also includes an outside diameter 108.

Compound applicator 102 includes an incrementally iterative advancement mechanism 110 which includes a trigger 112 and a push rod 114. Note advancement mechanism 110 is of the type which are known in the art wherein a push rod 114 which is connected internally inside a tube reservoir 106 to a plunger 100. The advancement occurs iteratively usually in preselected incremental strokes of 1/32" to over 2" per iteration.

By squeezing manually on trigger 112, push rod 114 is urged longitudinally downwardly along tube reservoir 106 thereby urging plunger 100 down tube reservoir 106 thereby urging compound 120 out of exit end 122 of tube reservoir 106.

Compound applicator 102 shown in FIG. 2 includes a connector 124 which includes a collar 126 for connecting exit end 122 of tube reservoir 106 to connector 124.

Compound applicator 102 also includes an applicator head 128 which has a receiver 130 and a receiver socket 132 for connecting connector 124 therein.

Applicator head 128 discharges compound 120 onto drywall 134.

Figure 1:
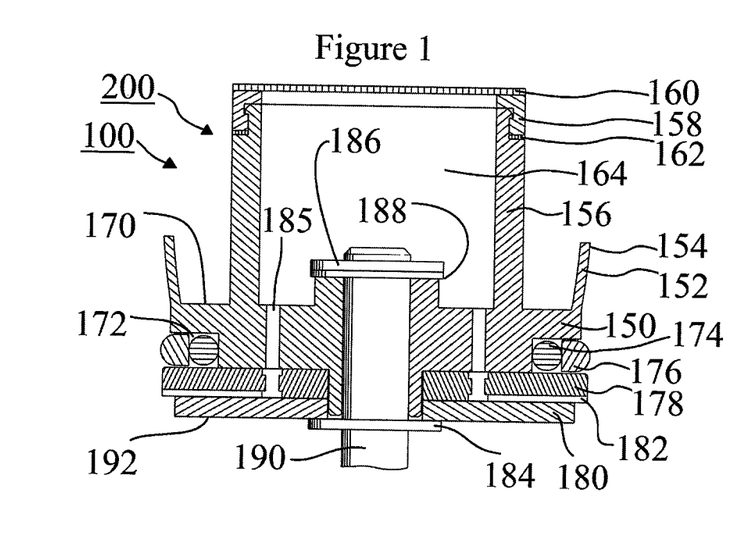
FIG. 1 is a cross sectional view of a plunger with damping mechanism in accordance with the present concept.

Referring now to FIG. 1 which shows the details of plunger 100 which includes the following major components namely; piston 150 which includes a piston skirt 152 having outer surface 154.

Piston 150 further includes a diaphragm mounting cup 156 which has mounted thereon a support ring 158 for fastening a diaphragm 160 thereto.

A gasket 162 sandwiched between support ring 168 and diaphragm mounting cup 156 seals off air reservoir 164 which is defined within the diaphragm mounting cup 156 and diaphragm 160.

Piston 150 further includes a front face 170 and there is defined therein a groove 172 for housing an O-ring 174 and an outer ring 176 therein.

Plunger 100 further includes a vented disk 178 and a washer 180 which defines an air passageway 182 there between.

Plunger 100 is held in position on push rod 190 with cir-clip 184, cir-clip 186 and washer 188.

Washer 180 includes a rear face 192.

Figure 4:
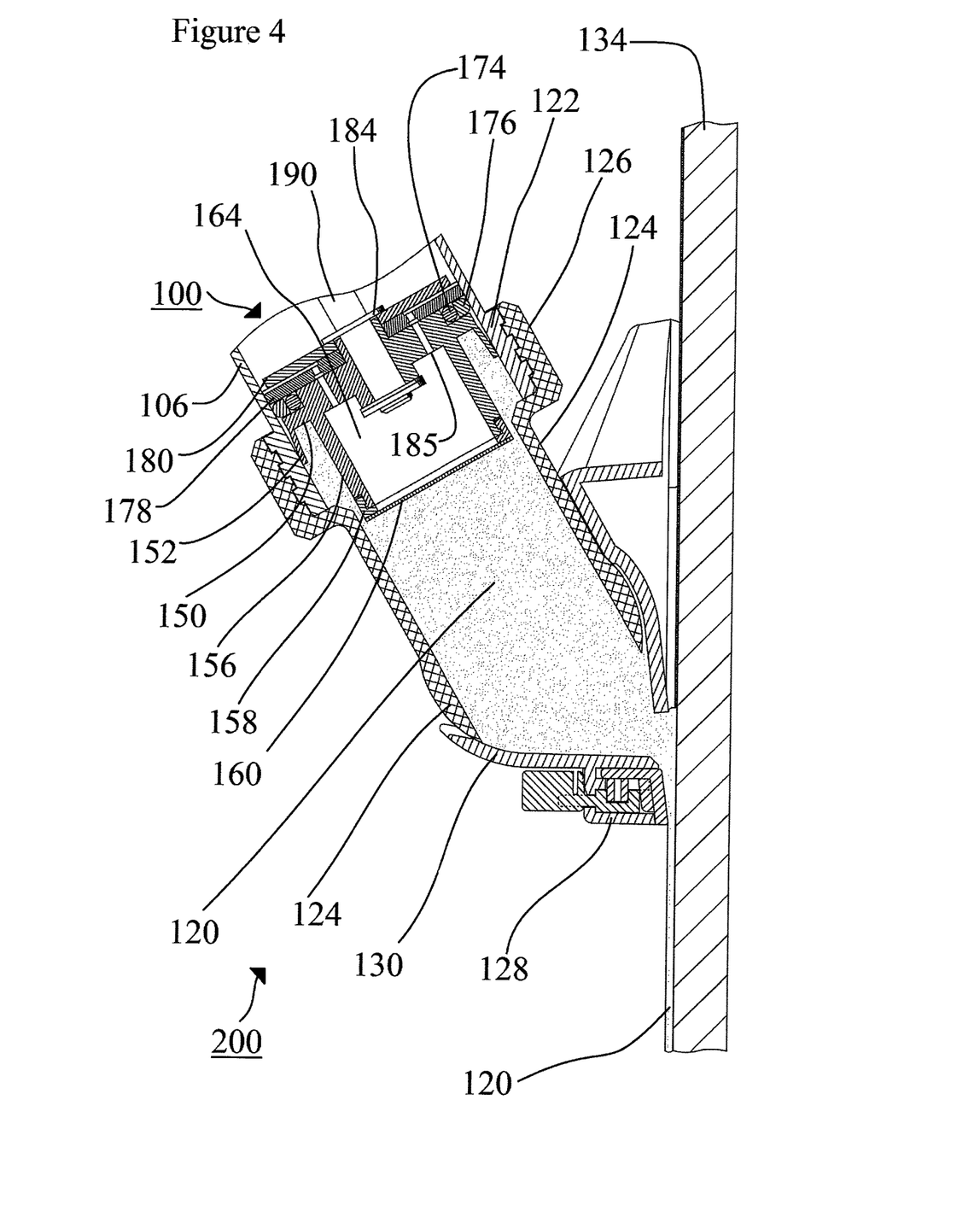
FIG. 4 is a side cross sectional view of the front portion of the compound applicator showing the plunger with damping mechanism in a low pressure position.

Referring now to FIG. 4 which shows plunger 100 in a low pressure position 200 wherein diaphragm 160 has not been deformed, from its natural rest position shown in FIG. 4.

Diaphragm 160 is made out of an elastic material such as rubber or other elastic materials known in the art and normally when no pressure is applied to diaphragm 160 it is in low pressure position 200 as shown in FIG. 2.

Figure 5:
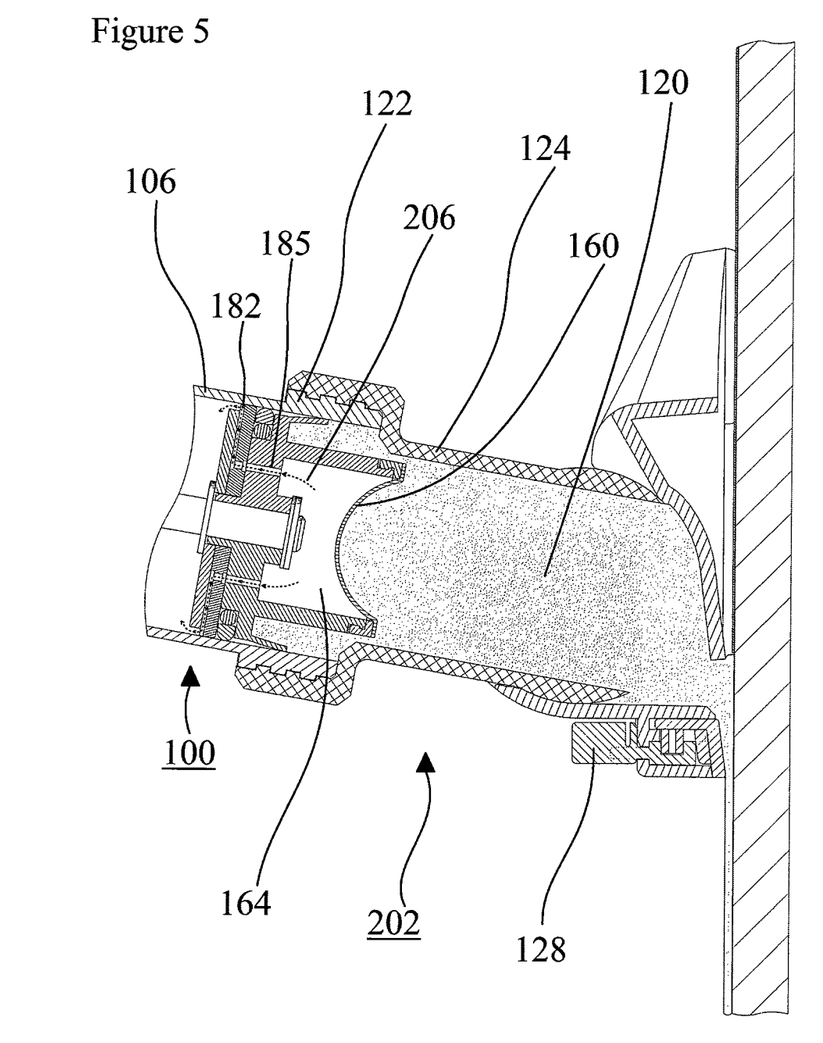
FIG. 5 is a side cross sectional view of the front portion of the compound applicator showing the plunger with damping mechanism in a high pressure position.

FIG. 5 depicts pressure applied to the trigger 112 of advancement mechanism 110 such that pressure within tube reservoir 106 significantly increases at the beginning of the incremental stroke and in some instances may spike as diaphragm 160 attempts to urge compound 120 out of the exit end 122 of tube reservoir 106.

This places diaphragm 160 into a high pressure position 202 as shown in FIG. 5 wherein diaphragm 160 is deformed inwardly.

The inward deformation of diaphragm 160 as shown in FIG. 5 causes are within air reservoir 164 to escape through vent 185 and then through air passageway 182 which is defined between washer 180 and vented disc 178.

Shown as airflow 206 is the air that is trapped within air reservoir 164 escaping out through vent 185 and also through air passageway 182.

This deformation of diaphragm 160 relieves or reduces temporarily the pressure within the tube reservoir 106 as the initial inertia of moving compound 120 down through tube reservoir 106 is overcome.

Since diaphragm 160 is made of an elastic material it will tend to want to return back to the low pressure position 200 which is also the rest position of diaphragm 160. Once again as diaphragm 160 moves from a high pressure position 202 to the low pressure position 200 air is drawn in through air passageway 182 and through vents 185.

By carefully selecting the size of vents 185 and air passageway 182 one can selectively control the amount of damping that diaphragm 160 effectively will create during any pressure spike within tube reservoir 106.

Figure 6:
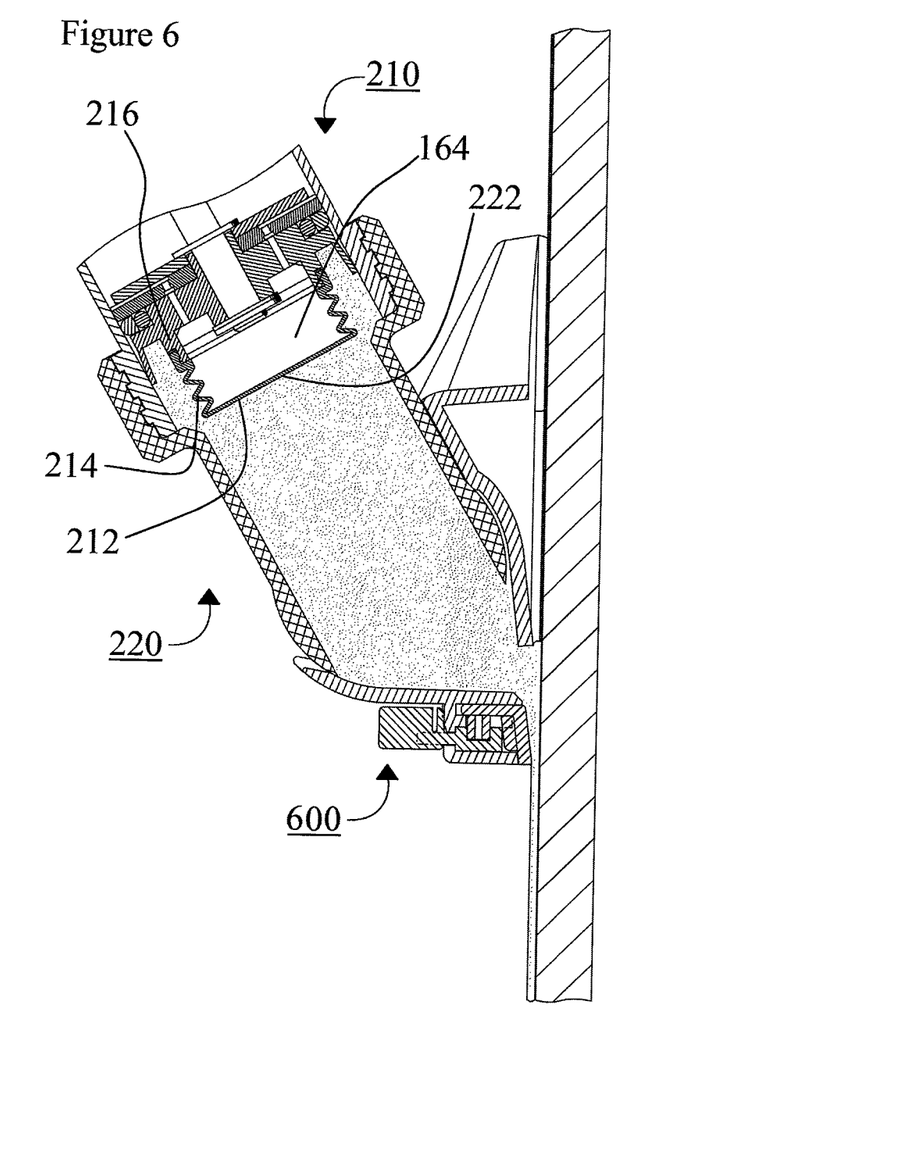
FIG. 6 is a schematic cross sectional view of the front portion of the compound applicator showing the plunger with bellows as a damping mechanism in a low pressure position.

An alternate embodiment is shown in FIG. 6 namely rather than including a diaphragm 160, plunger 210 includes bellows 212 which includes side walls 214.

Plunger includes bellows mounting cup 216 and is shown in a low pressure position 220. Bellows 212 also includes a top membrane 222.

Figure 7:
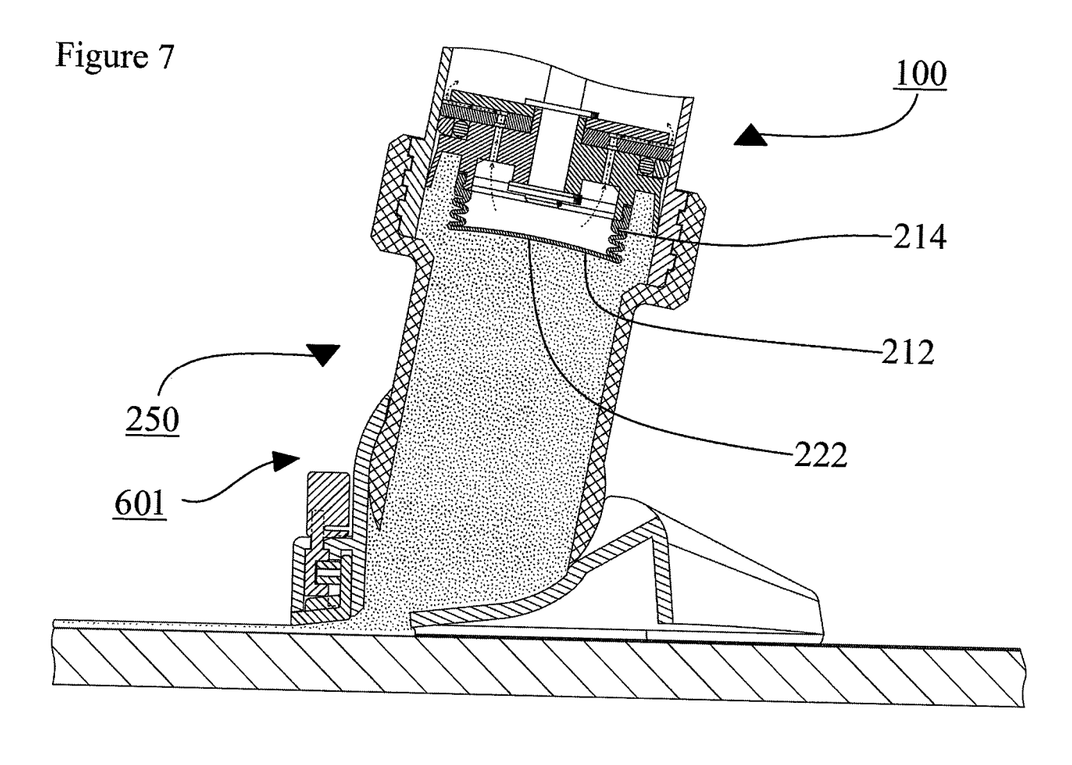
FIG. 7 is a schematic cross sectional view of the front portion of the compound applicator showing the plunger with bellows as a damping mechanism in a high pressure position.

Bellows 212 shown in the low pressure position 220 in FIG. 6 and in FIG. 7 is shown in the high pressure position 250 wherein the bellows side walls 214 collapse and also there is some defamation of bellows 212.

Therefore pressure fluctuations can be minimized within tube reservoir 106 using bellows 212 in a similar manner as diaphragm 160 will tend to want to return to the rest position which in this case is a low pressure position shown as 220 in FIG. 6.

There are some other notable features of plunger 100 namely the piston skirts 152 have an outer surface 154 which slides against the inside diameter 104 of tube reservoir 106. This helps in sealing compound 120 within tube reservoir 106 and prevents leakage past plunger 100.

Additionally there is a groove 172 within piston 150 which includes an inner O-ring 174 and an outer O-ring 176 which seals against the inside diameter 104 of tube reservoir 106.

Therefore plunger 100 has a dual sealing mechanism namely piston skirt 152 and outer ring 174 both of which make slideable contact against the inside diameter 104 of tube reservoir 106.

Referring again to FIG. 5 one will see that airflow 206 essentially is vented into and in behind plunger 100 which essentially is simply an air space found behind plunger 100 as it advances forward down tube reservoir 106. The space in behind plunger 100 within tube reservoir 106 is normally vented to atmosphere.

Further Embodiment

Figure 9:
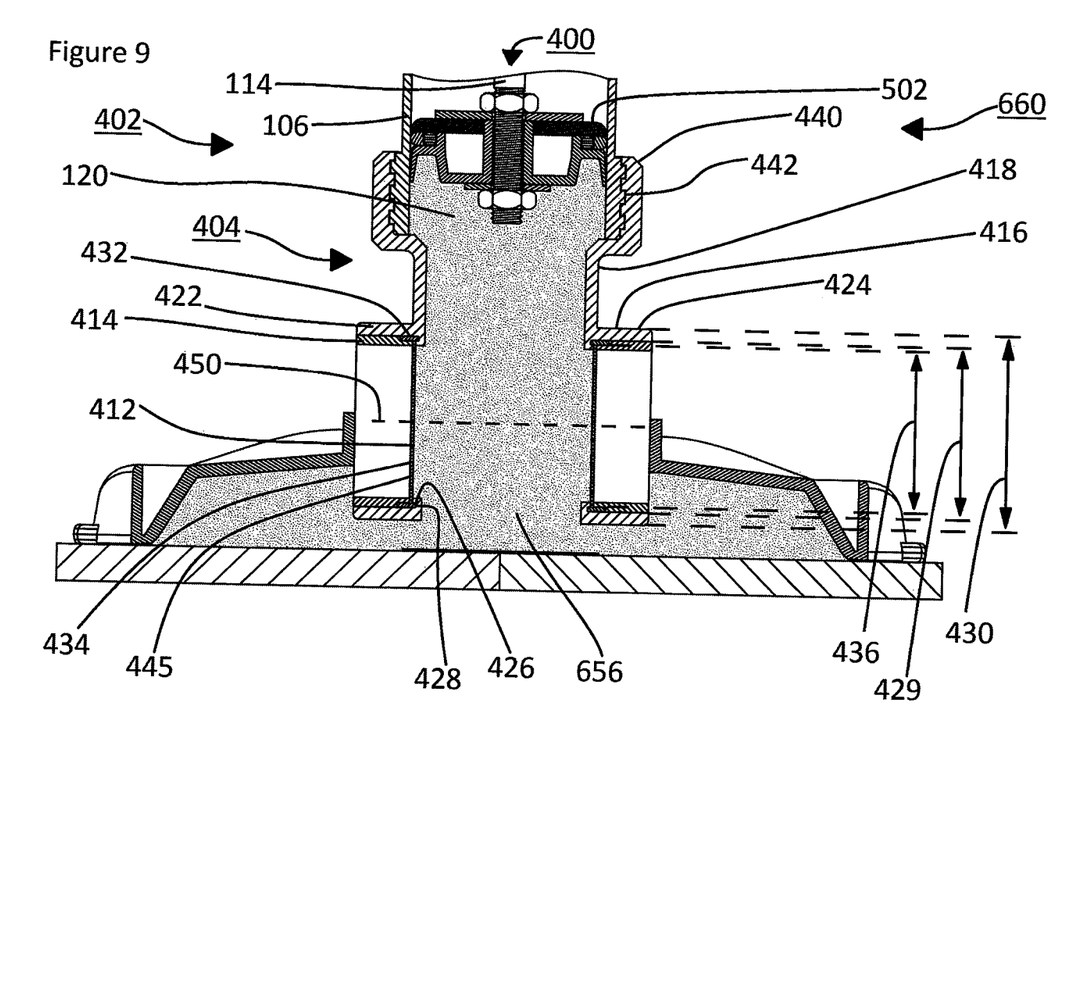
FIG. 9 is a schematic cross sectional side view of a compound applicator including an applicator head with damping mechanism in a low pressure position 660.
Figure 10:
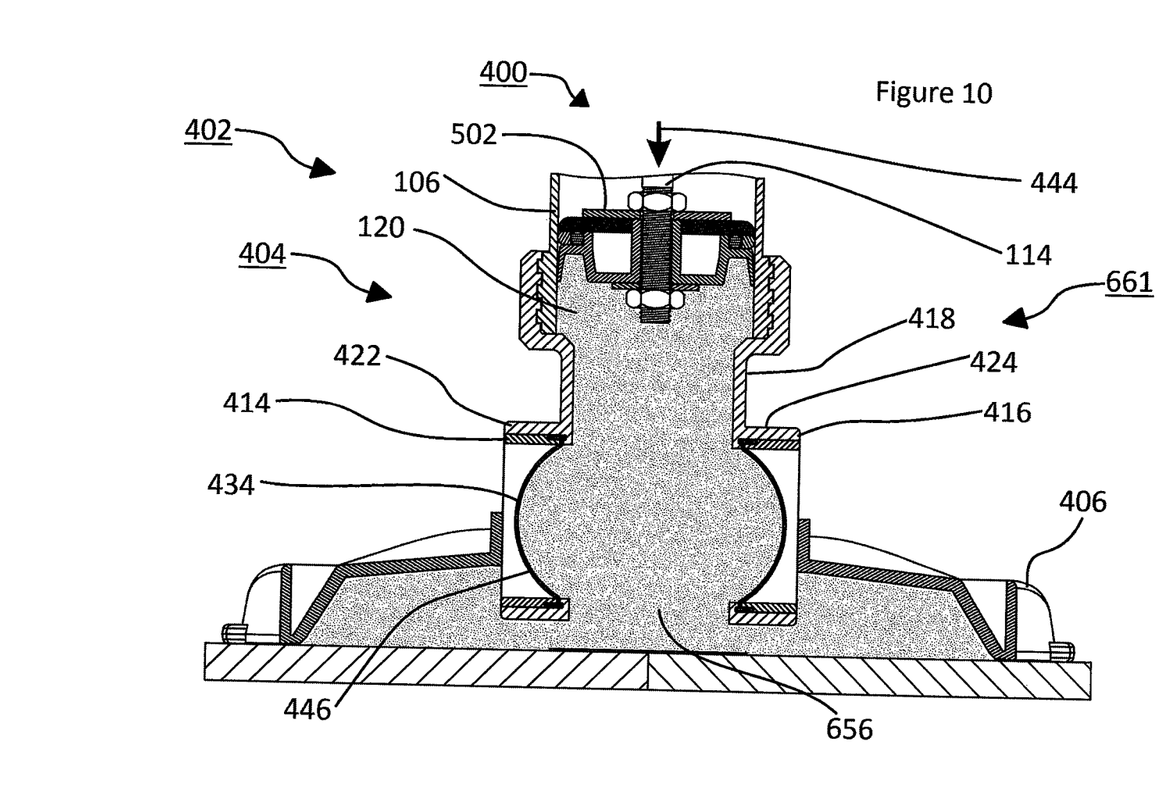
FIG. 10 is a schematic cross sectional side view of a compound applicator including an applicator head with damping mechanism in a high pressure position.

An alternate embodiment of the present concept, damping mechanisms for compound applicators, is shown as a subcomponent of a compound applicator 400 in FIGS. 9 to 10.

Referring to FIGS. 8 to 11, the major components of compound applicator 400 are as follows: applicator head 402 attached to a tube reservoir 106 which in turns is attached to an applicator gun 501.

Figure 8:
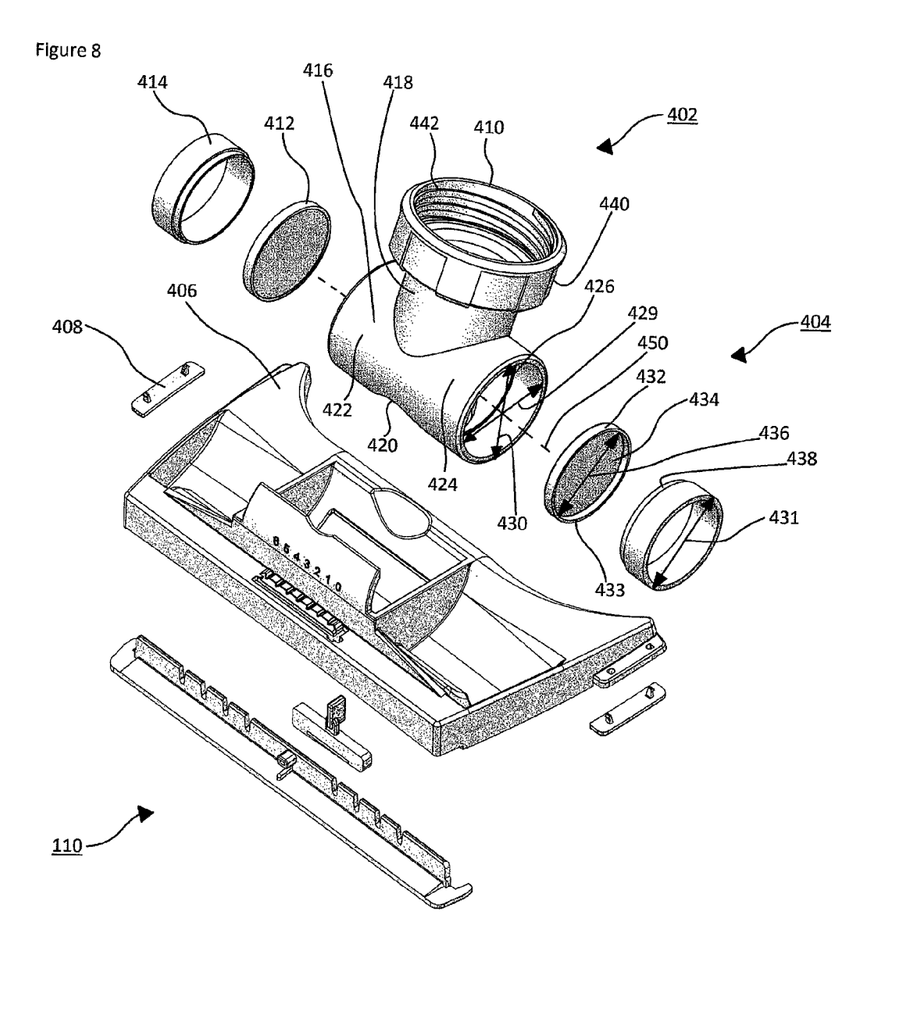
FIG. 8 is an exploded schematic perspective view of an applicator head with damping mechanism.

Referring now to FIGS. 8 to 10 the applicator head is depicted and shown generally as 402. The major components of the applicator head 402 are as follows: pressure control connector 404, body 406, front skid 408, and adjustment mechanism 110.

Pressure control connector 404 includes a means for dampening pressure spikes created in the tube reservoir 106 comprising: a hollow junction 410, one or more diaphragms 412 and one or more support inserts 414. The hollow junction 410 having a transverse section 416, a longitudinal section 418 and an outlet 420. The outlet 420 communicates with flow channel 656 shown in FIGS. 9 and 10.

Transverse section 416 has an inner connector diameter 429, an outer connector diameter 430 and pivots about pivot axis 450 as shown in FIG. 6 and FIG. 7 where the connector pivots between a down position 600 and an up position 601 respectively.

The transverse section 416 also has a right shoulder 422 and left shoulder 424. Each shoulder has an internal diaphragm lip 426 having a groove 428. The edge of the internal diaphragm lip 426 defines a circular aperture having a diameter smaller than the inner connector diameter 429.

The diaphragm 412 includes a flange 432 and a resilient membrane 434. The outer diameter of the flange 432 is substantially equal to the inner connector diameter 429. The diameter of the membrane is the diaphragm diameter 436. The flange 432 has a thickness 433 equal to half the difference between the inner connector diameter 429 and the diaphragm diameter 436.

The support insert 414 has a hollow cylinder structure with openings on both circular faces. The end diameter of the support insert 414 is a frame diameter 431 sized substantially equal to the inner connector diameter 429. The support insert 414 includes an external diaphragm seat 438 which is a recess corresponding to thickness 433 such that it may receive a portion of the flange 432.

The diaphragm 414 is captivated within the transverse section 416. The internal portion of the flange 432 is received by the inner diaphragm lip 426 and is secured within the groove 428. The external portion of the flange 432 is received by the support insert 414 when the support insert 414 is set within the transverse section 416. For greater clarity, the diaphragm 412 is secured by the internal diaphragm lip 426, the external diaphragm seat 438 and the inner surface of the transverse section 416 of the hollow junction 410.

Figure 11:
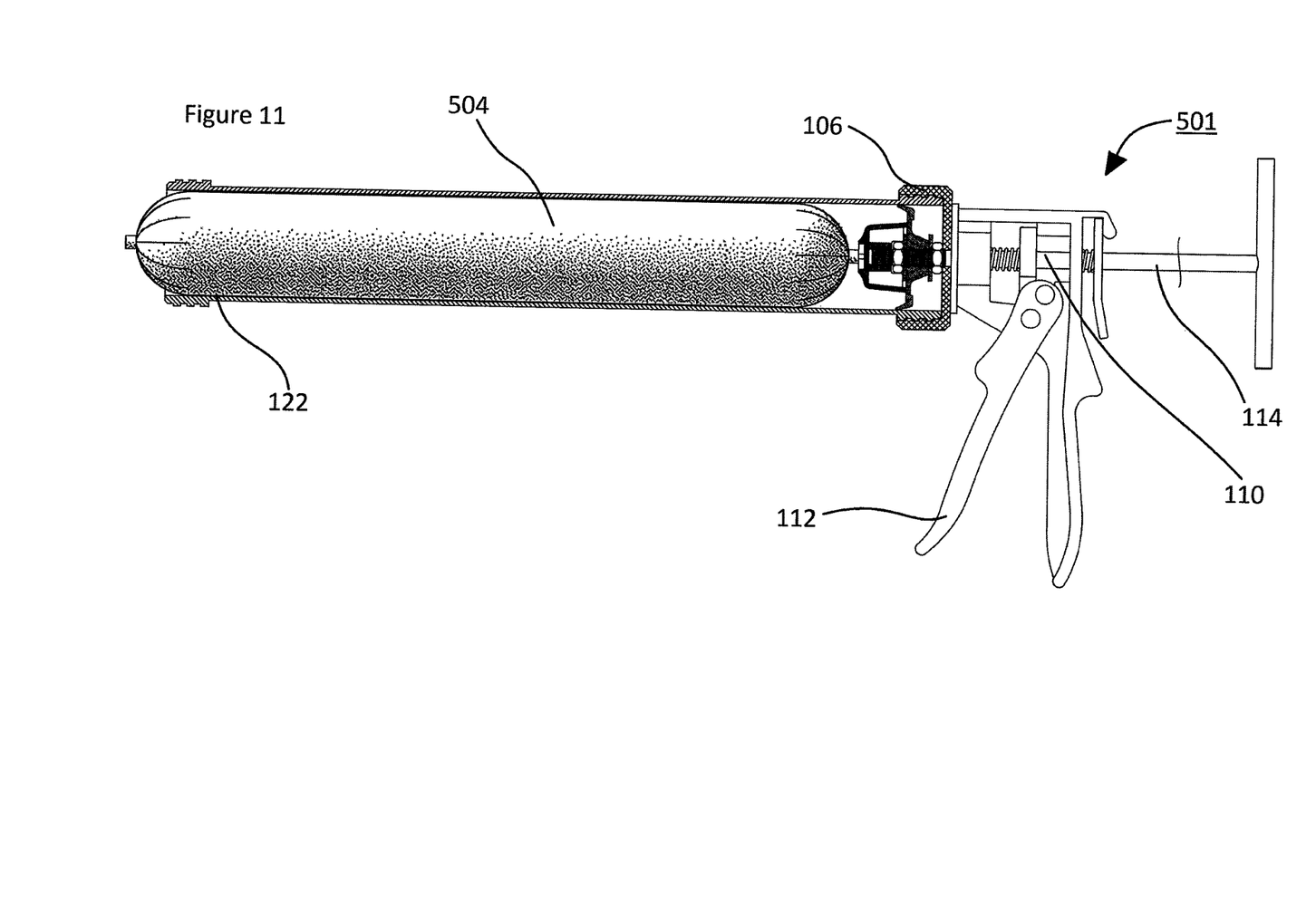
FIG. 11 is a schematic perspective view of a compound applicator without the applicator head and with a portion of the tube reservoir removed to show the use of mudpacks.

Referring now to FIG. 11 the applicator gun 508 of the compound applicator 400 includes an advancement mechanism 110 which includes a push rod 114 and a trigger 122. Advancement mechanism 110 is described above and of the type known in the art used in for example caulking guns.

Tube reservoir 106 is attached to applicator gun 501 at cap 132 and is attached at exit end 134 threadably to collar 440 of applicator head 402 both shown in FIG. 8. For greater clarity, the pressure control connector 404 of the applicator head 402 is connected to tube reservoir 106 via collar 440 which includes threads 442 which are shown in FIG. 8.

Tube reservoir 106 not shown in FIG. 8 however shown in FIGS. 12 to 15 houses a plunger 502 which is attached to push rod 114 and is urged longitudinally down through tube reservoir 106 for the purpose of urging compound or other materials found within tube reservoir 106 out through exit end 122. Referring now to FIG. 11 the material found within tube reservoir 106 may be further contained within a flexible mudpack 504.

FIG. 10 shows the compound 120 which is forceably urged by plunger 502 out through flow channel 656 and ultimately to the drywall 274.

Further Embodiment—In Use

Referring now to FIGS. 9 and 10 the applicator head 402 is shown firstly in a low pressure position 660 in FIG. 9 wherein the membrane 434 of diaphragm 412 captivated in the pressure control connector 404 has a profile 445 with minimal curvature. In this position the pressure of the compound 120 is substantially uniform throughout the pressure control connector 404. The low pressure position 660 is the resting condition of the dampening mechanism.

FIG. 10 shows the applicator head 402 in a high pressure position 661. The high pressure position 661 results from the sudden urging of the push rod 114 in an outlet direction 444 by the applicator gun 501 not visible in FIG. 10 but shown in FIG. 11. For greater clarity, the push rod 114 is coupled with the plunger 501 therefore the plunger is also urged in the outlet direction 444 by the applicator gun 204.

This sudden urging creates a local high pressure perturbation in the compound 120 beginning at the plunger 502 and moving through the longitudinal section 418 in the outlet direction 444. When the perturbation reaches the transverse section 416 the membrane 434 of the diaphragm 412 resiliently deforms to have a convex profile 446 temporarily enlarging to stabilize the pressure and ensure a substantially steady mass flow rate through the flow channel 656.

Referring to FIGS. 9 to 11 the reader will note that placing the pressure control connector 404 at the inlet of the body 406 makes the precise means of compound 120 storage in the tube reservoir 106 immaterial. For greater clarity, the compound 120 may for example be contained directly in the tube reservoir 106 or within a further enclosure such as a mudpack 504.

It should be apparent to persons skilled in the arts that various modifications and adaptation of this structure described above are possible without departure from the spirit of the invention the scope of which defined in the appended claim.

I claim:

1. A dampening mechanism in combination with a compound applicator, the combination comprises:
   a) a compound applicator which includes an incrementally iterative advancement mechanism for urging a plunger along a tube reservoir in preselected incremental strokes, the plunger urging compound along the tube reservoir and out through an applicator head;
   b) the compound applicator includes a means for dampening pressure spikes created in the tube reservoir during an incremental stroke of the plunger, wherein the dampening means is mounted outside of the tube reservoir.

2. The combination claimed in claim 1 wherein the dampening means includes a resiliently deformable diaphragm with one side exposed to atmosphere and the other side exposed to the compound such that a pressure spike in the compound resiliently deforms the diaphragm thereby reducing the pressure spike in the compound.

3. The combination claimed in claim 2 further includes a pressure control connector for connecting the tube reservoir to an applicator head body and channelling compound from the reservoir to the body, the connector includes a hollow transverse section dimensioned to fit in a socket defined in the body, wherein at least one distal end of the transverse section includes the diaphragm.

4. The combination claimed in claim 3 wherein the pressure control connector includes a hollow longitudinal section attached to a hollow transverse section.

5. The combination claimed in claim 4 wherein the connector pivots within the socket between a down position and an up position about a pivot axis.

6. The combination claimed in claim 3 wherein the connector includes a hollow cylindrical transverse section dimensioned to fit in a cylindrical socket wherein each distal end of the transverse section includes the diaphragm.

7. The combination claimed in claim 1 wherein the compound applicator further includes an applicator head for dispensing compound, the head includes a diaphragm mounted therein with one side exposed to atmosphere and the other side exposed to the compound such that a pressure spike resiliently deforms the diaphragm thereby reducing the pressure spike in the compound.

8. A dampening mechanism in combination with a compound applicator, the combination comprises:
   a) a compound applicator which includes an incrementally iterative advancement mechanism for urging a plunger along a tube reservoir in preselected incremental strokes, the plunger urging compound along the tube reservoir and out through an applicator head;
   b) the compound applicator includes a means for dampening pressure spikes created in the tube reservoir during an incremental stroke of the plunger,
   c) wherein the dampening means includes a resiliently deformable diaphragm mounted to the piston, with one side exposed to atmosphere and the other side exposed to the compound such that a pressure spike created by an incremental stroke of the piston deforms the diaphragm thereby absorbing a portion of the pressure spike which reduces the pressure spike in the compound;
   d) wherein the piston includes a mounting cup for receiving the diaphragm thereon forwardly of the piston.

9. The combination claimed in claim 8 wherein the diaphragm moveable between a low pressure position and a high pressure position.

10. The combination claimed in claim 8 wherein the mounting cup extending forwardly from a front face of the piston, the forward portion of the cup dimensioned to receive the diaphragm thereon.

11. The combination claimed in claim 8 wherein the diaphragm includes bellows sidewalls, and a top membrane.

12. The combination claimed in claim 8 wherein the piston further includes vents for communicating air into the mounting cup thereby exposing the back side of the diaphragm to atmospheric pressure.

* * * * *